(12) United States Patent
Cappellini (10) Patent No.: US 11,300,169 B2
(45) Date of Patent: Apr. 12, 2022

(54) BRAKE DISC

(71) Applicant: Nabtesco Corporation, Tokyo (JP)

(72) Inventor: Stefano Cappellini, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/571,654

(22) Filed: Sep. 16, 2019

(65) Prior Publication Data

US 2020/0088254 A1  Mar. 19, 2020

(30) Foreign Application Priority Data

Sep. 18, 2018 (JP) .............................. JP2018-173312

(51) Int. Cl.
  *F16D 65/12* (2006.01)
  *F16D 65/02* (2006.01)
(52) U.S. Cl.
  CPC ........... *F16D 65/128* (2013.01); *F16D 65/12* (2013.01); *F16D 2065/1328* (2013.01)
(58) Field of Classification Search
  CPC .............................................. F16D 65/12–128
  USPC .................... 188/218 XL, 264 A, 264 AA
  See application file for complete search history.

(56) References Cited

U.S. PATENT DOCUMENTS 9,506,515 B2  11/2016 White et al.
9,709,108 B2 *  7/2017 Wurth ................... F16D 65/125

2015/0021128 A1  1/2015 White et al.
2019/0195300 A1  6/2019 Hammerl et al.
2019/0353216 A1*  11/2019 Ronchi ................. F16D 65/128

FOREIGN PATENT DOCUMENTS

| CN | 105393016 A | 3/2016 |
| CN | 106151322 A | 11/2016 |
| CN | 206958129 U | 2/2018 |
| DE | 102008013874 A1 | 9/2009 |
| JP | 11-303908 A | 11/1999 |
| WO | 2016/058792 A1 | 4/2016 |

(Continued)

OTHER PUBLICATIONS

Extended European Search Report issued in corresponding EP Application No. 19197641.4 dated Feb. 7, 2020.

(Continued)

*Primary Examiner* — Christopher P Schwartz
(74) *Attorney, Agent, or Firm* — Pillsbury Winthrop Shaw Pittman, LLP (57) ABSTRACT

A brake disc according to one embodiment includes a first disc, a second disc apart from the first disc in an axial direction, and a plurality of pins disposed at intersections of three types of virtual lines and whose one ends are connected to a side of the first disc facing the second disc. The three types of virtual lines are a plurality of virtual circles concentric with the first disc, a plurality of first virtual spiral patterns passing through the center of the first disc and curved rightward when viewed from the axial direction, and a plurality of second virtual spiral patterns passing through the center of the first disc and curved leftward when viewed from the axial direction. In one embodiment, the intersections are arranged symmetrically with respect to an imaginary line connecting any one of the intersections and the center when viewed from the axial direction.

10 Claims, 7 Drawing Sheets

(56) References Cited

FOREIGN PATENT DOCUMENTS

WO  2017/153873 A1  9/2017
WO  2018/041562 A1  3/2018

OTHER PUBLICATIONS

First Office Action dated Aug. 28, 2020 issued in corresponding Chinese Patent Application No. 201910879707.7 with English translation (10 pgs.).
Communication pursuant to Article 94(3) EPC dated Oct. 14, 2020 issued in corresponding European Patent Application No. 19197641.4 (4 pgs.).
Non-Final Office Action dated Sep. 1, 2020 issued in corresponding Taiwanese Patent Application No. 108133536 with English translation (10 pgs ).
Second Office Action dated Mar. 31, 2021, issued in corresponding Chinese Patent Application No. 201910879707.7 with partial English translation (9 pgs.).
Second Office Action dated Mar. 31, 2021, issued in corresponding Japanese Patent Application No. 201910879707.7 with partial English translation (9 pgs.).
Third Office Action dated Jun. 22, 2021 issued in corresponding Chinese Patent Application No. 201910879707.7 with English translation (11 pgs).
Decision of Rejection dated Oct. 26, 2021, issued in corresponding Chinese Patent Application No. 201910879707.7 with English translation (10 pgs.).

\* cited by examiner

BRAKE DISC

CROSS-REFERENCE TO RELATED APPLICATIONS

This application is based on and claims the benefit of priority from Japanese Patent Application Serial No. 2018-173312 (filed on Sep. 18, 2018), the contents of which are hereby incorporated by reference in its entirety.

TECHNICAL FIELD

The present discloser relates to a brake disc. More particularly, the disclosure relates to a ventilated brake disc.

BACKGROUND

As one type of a brake disc for a disc brake device, known is a ventilated brake disc that includes a pair of discs spaced apart from each other and heat dissipation pins provided between the pair of discs. A ventilated brake disc provided with heat dissipation pins is disclosed, for example, in International Publication WO2016/058792.

It is desired that the heat dissipation pins be arranged in the ventilated brake disc such that not only a heat dissipation effect but also an good rotation balance are realized and a turbulent flow generated around the disc is prevented in order to reduce a travel resistance.

SUMMARY

The disclosure is directed to improve a ventilated brake disc with heat dissipation pins. One specific object of the disclosure is to provide a ventilated brake disc with a fine rotational balance and capable of reducing a turbulent flow generated around the disc. Other objects of the disclosure will be apparent with reference to the entire description in this specification.

A brake disc according to one embodiment includes a first disc, a second disc apart from the first disc in an axial direction, and a plurality of pins disposed at intersections of three types of virtual lines and whose one ends are connected to a side of the first disc facing the second disc. The three types of virtual lines are a plurality of virtual circles concentric with the first disc, a plurality of first virtual spiral patterns passing through the center of the first disc and curved rightward when viewed from the axial direction, and a plurality of second virtual spiral patterns passing through the center of the first disc and curved leftward when viewed from the axial direction. In one embodiment, the intersections are arranged symmetrically with respect to an imaginary line connecting any one of the intersections and the center when viewed from the axial direction.

In one embodiment of the invention, the plurality of pins are evenly arranged along each of the virtual circles in a circumferential direction around the center of the first disc.

In one embodiment, the plurality of virtual circles include a first virtual circle and a second virtual circle that is situated radially outer side relative to the first virtual circle, and among the plurality of pins, a distance between two adjacent pins on the second virtual circle is larger than a distance between two adjacent pins on the first virtual circle.

In one embodiment, each of the plurality of pins has a first base end portion connected to the first disc, a second base end portion connected to the second disc, and a middle portion situated between the first base end portion and the second base end portion and having a cross section smaller than that of the first base end portion and the second base end portion.

In one embodiment, the plurality of pins include a first pin and a second pin that is situated outer side relative to the first pin in the radial direction of the first disc, and a cross-sectional dimension of the first base end portion of the second pin is larger than a cross-sectional dimension of the first base end portion of the first pin.

In one embodiment, each of the plurality of first spiral patterns and each of the plurality of second spiral patterns is a spiral pattern selected from the group consisting of a logarithmic spiral pattern, a Fibonacci spiral pattern, an Archimedes spiral pattern, a Ferma spiral pattern, an Euler spiral pattern, a hyperbolic spiral pattern, and a lituus spiral pattern.

In one embodiment, each of the plurality of first spiral patterns and each of the plurality of second spiral patterns is a golden spiral pattern.

In one embodiment, five or more virtual circles are provided on the first disc.

Another embodiment of the invention relates to a brake device. The brake device includes one of the above-described brake disc.

According to the embodiments, provided is a ventilated brake disc with a fine rotational balance and capable of reducing a turbulent flow generated around the disc.

DESCRIPTION OF THE EMBODIMENTS

Various embodiments of the invention will be described hereinafter with reference to the accompanying drawings. In the figures, like referenced numerals designate corresponding parts throughout the different views. It should be noted that the drawings do not necessarily appear to an accurate scale for the sake of convenience of explanation.

A brake disc according to one embodiment of the invention will be described with reference to FIGS. 1 to 5. A brake disc 1 according to one embodiment of the invention is a ventilated brake disc that includes a first disc 2, a second disc 3, a plurality of pins 4, and a hub 5.

The first disc 2 and the second disc 3 are formed in a ring shape whose outline is substantially circular in plan view. In the illustrated embodiment, the first disc 2 and the second disc 3 have the same outer diameter. The first disc 2 has an outer surface 2a and an inner surface 2b facing the outer surface 2a. The second disc 3 has an outer surface 3a and an inner surface 3b facing the outer surface 3a. A through hole 2c is formed at the center of the first disc 2 and a through hole 3c is formed at the center of the second disc 3. The through hole 2c and the through hole 3c have a hole diameter corresponding to an outer diameter of the hub 5.

The first disc 2 and the second disc 3 are provided so as to be separated from each other in an axial direction along the central axis C perpendicular to the first disc 2 and the second disc 3. The central axis C is an virtual axis that passes through the centers of the first disc 2 and the second disc 3 and extends in a direction perpendicular to the first disc 2 and the second disc 3. Accordingly, as clearly shown in FIG. 3, when the brake disc 1 is viewed in a plan, the position of the central axis C coincides with the centers of the first disc 2 and the second disc 3. Therefore, when describing shapes and arrangements of components of the disc brake 1 in plan view, the center of the first disc 2 may be referred to as the center C. The first disc 2 and the second disc 3 are disposed such that the inner surface 2b of the first disc 2 and the inner surface 3b of the second disc 3 face each other. A friction pad (not shown) is pressed against the outer surface 2a of the first disc 2 and the outer surface 3a of the second disc 3. The friction pad is controlled to move toward and away from the outer surface 2a of the first disc 2 and the outer surface 3a of the second disc 3 by a caliper (not shown). The brake caliper applies a braking force to the disc brake 1 through a frictional force or an electromagnetic force. A brake caliper that applies a braking force through the frictional force is configured to press the disc pad against the disc brake 1. The brake caliper that applies a braking force through the frictional force generates an eddy current in the rotating disc brake 1 by applying a magnetic field to the rotating disc brake 1 with a permanent magnet or an electromagnet.

Between the first disc 2 and the second disc 3, the plurality of pins 4 are provided. Frictional heat generated by friction between the friction pad and the first and second discs 2, 3 is released to the atmosphere from surfaces of the pins 4 as well as the outer surface 2a and the inner surface 2b of the first disc 2 and the outer surface 3a and the inner surface 3b of the second disc 3. Since a contact area between the brake disc 1 and the atmosphere is increased with the pins 4, the first disc 2 and the second disc 3 can be efficiently cooled. Each of the plurality of pins 4 is formed in a columnar shape extending in the axial direction along the center axis C. In the illustrated embodiment, the pin 4 is configured such that a cross section 41 in a plane perpendicular to the central axis C has a substantially circular shape. The shape of the cross section 41 obtained by cutting the pin 4 in the plane perpendicular to the center axis C is not limited to a circle but may be, for example, elliptical, polygonal, and other shapes. The arrangement (arrangement in plan view) of the pins 4 as viewed from the direction of the central axis C will be described later.

In the illustrated embodiment, the pins 4 provided at the innermost position among the plurality of pins 4 in the radial direction are formed to have a cross-sectional shape different from those of the other pins 4 situated on the outer side in the radial direction. For convenience of description, the pins provided at the innermost position in the radial direction among the plurality of pins 4 may be referred to as innermost pins 14. That is, the innermost pins 14 are the pins 4 situated at the innermost position in the radial direction.

Between the first disc 2 and the second disc 3, a plurality of support members 6 are provided. In the illustrated embodiment, twelve support members 6 are provided. The plurality of support members 6 may be formed in the same shape to each other. The support members 6 may be disposed at equal intervals in the circumferential direction around the central axis C. Since the plurality of support members 6 have the same shape and are disposed at equal intervals in the circumferential direction, rotational balance of the disc brake 1 is maintained. In the illustrated embodiment, each of the innermost pins 14 is provided between two adjacent support members 6. The innermost pin 14 may be disposed at a position equidistant from the two adjacent support members 6 in the circumferential direction.

Each of the support members 6 protrudes inwardly from the first disc 2 and the second disc 3 in the radial direction. The support members 6 are connected to each other by the hub 5 and bolts 7 inserted in the through hole 2c of the first disc 2 and the through hole 3c of the second disc 3. In this way, the first disc 2 and the second disc 3 support the hub 5 with the support members 6.

The brake disc 1 is attached to an axle (not shown) via the hub 5. The hub 5 is fixed to the axle. Therefore, the brake disc 1 rotates together with the axle. Since the brake disc rotates with the axle, the brake disc is sometimes called a disc rotor. During braking of the axle, a braking force is applied to the first disc 2 and the second disc 3 by pressing the friction pad against the first disc 2 and the second disc 3 that rotate together with the axle. In this manner, rotation of a rotating member such as the axle can be stopped by a brake device provided with the brake disc 1. The brake device includes the brake disc 1 and the friction pad contacting the outer surface 2a of the first disc 2 and the outer surface 3a of the second disc 3.

In one embodiment, the first disc 2, the second disc 3, the pins 4, and the support members 6 may be formed by casting of a material with a high heat resistance and abrasion resistance. The material of the first disc 2, the second disc 3, the pins 4 and the support members 6 may be selected from cast iron and any other materials having a high heat resistance and wear resistance. Alternatively, the first disc 2, the second disc 3, the pins 4, and the support members 6 formed by other method than casting.

Figure 1:
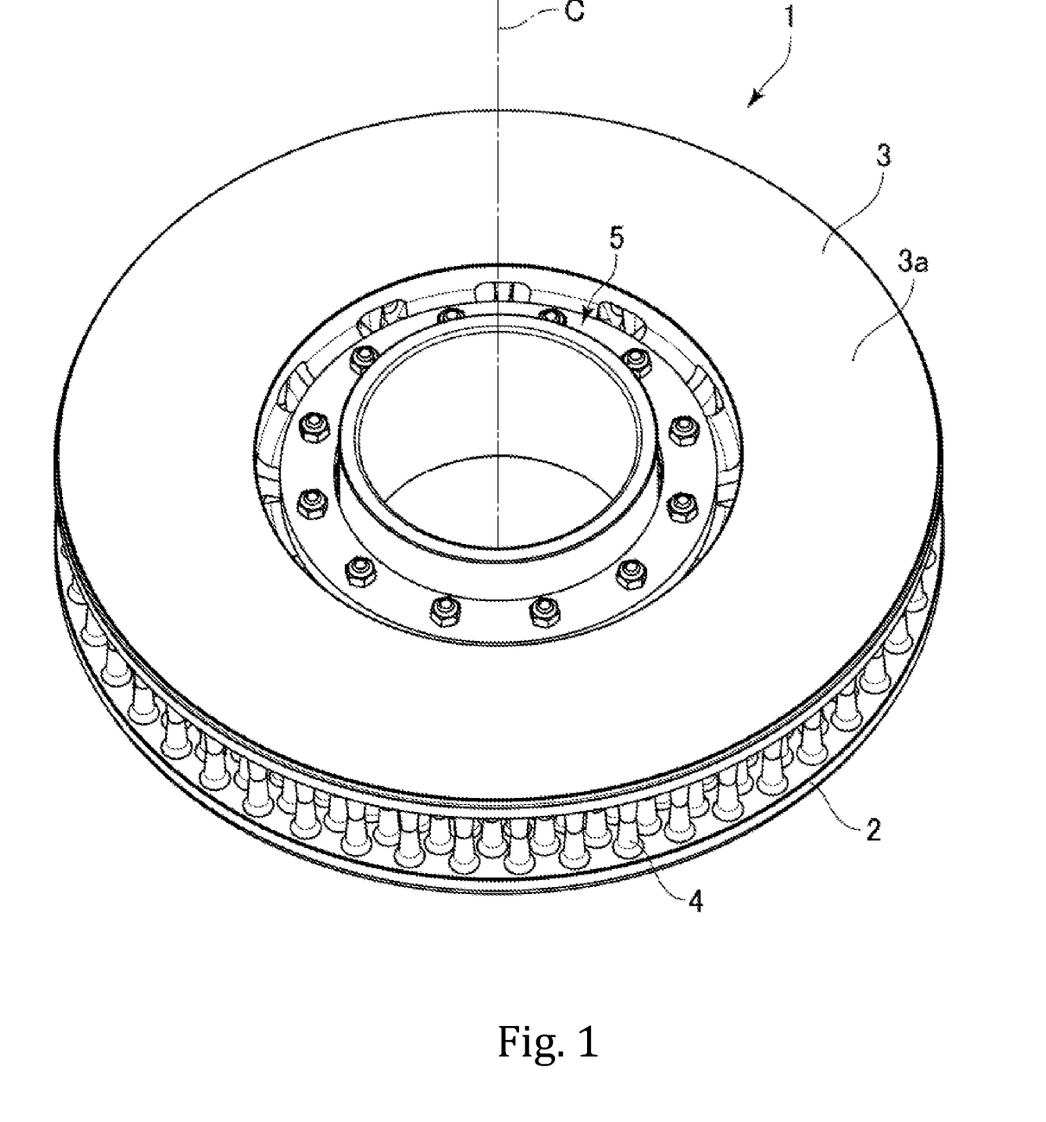
FIG. 1 is a schematic perspective view of a brake disc according to one embodiment of the invention.
Figure 2:
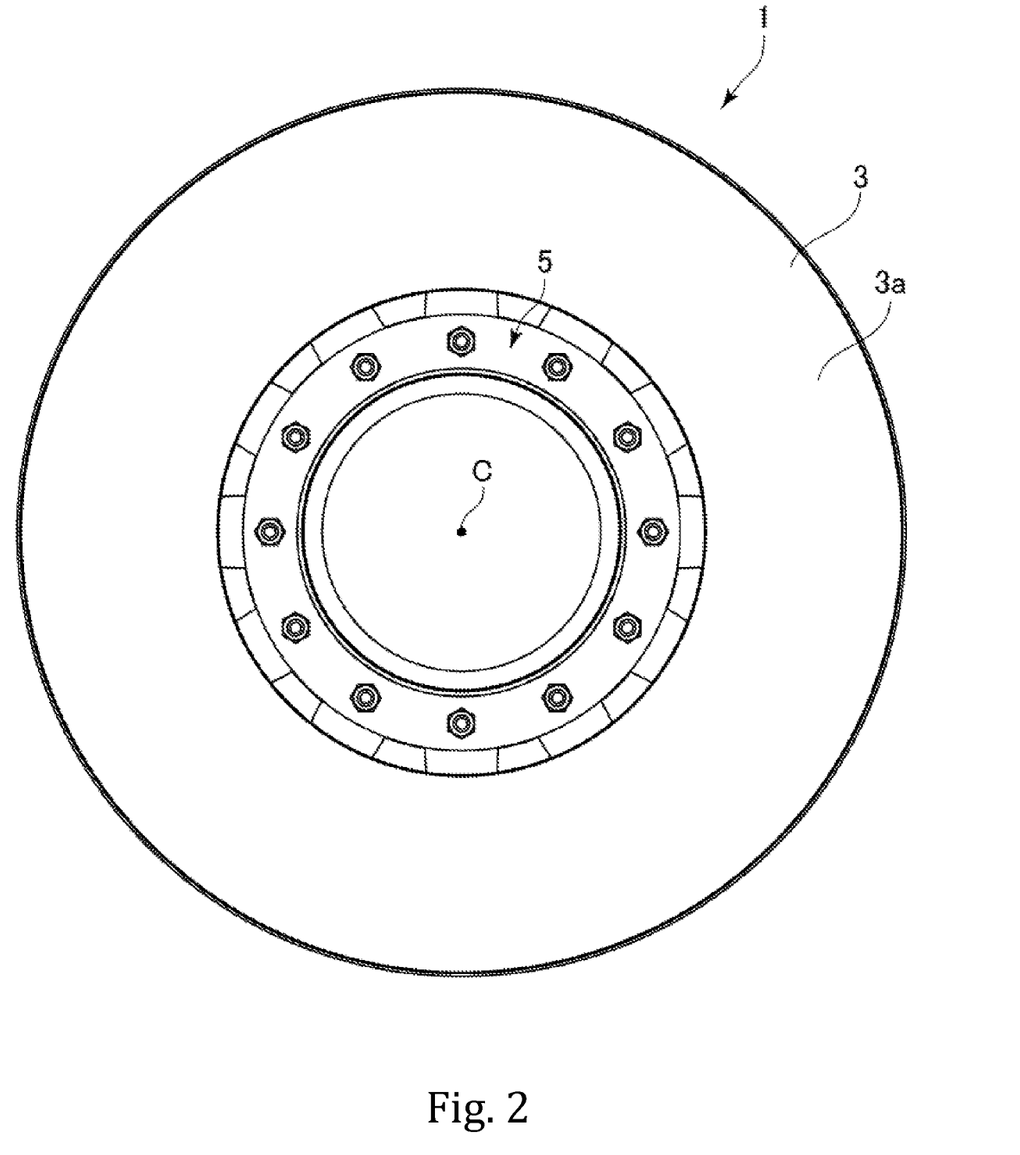
FIG. 2 is a plan view of the brake disc in FIG. 1.
Figure 3:
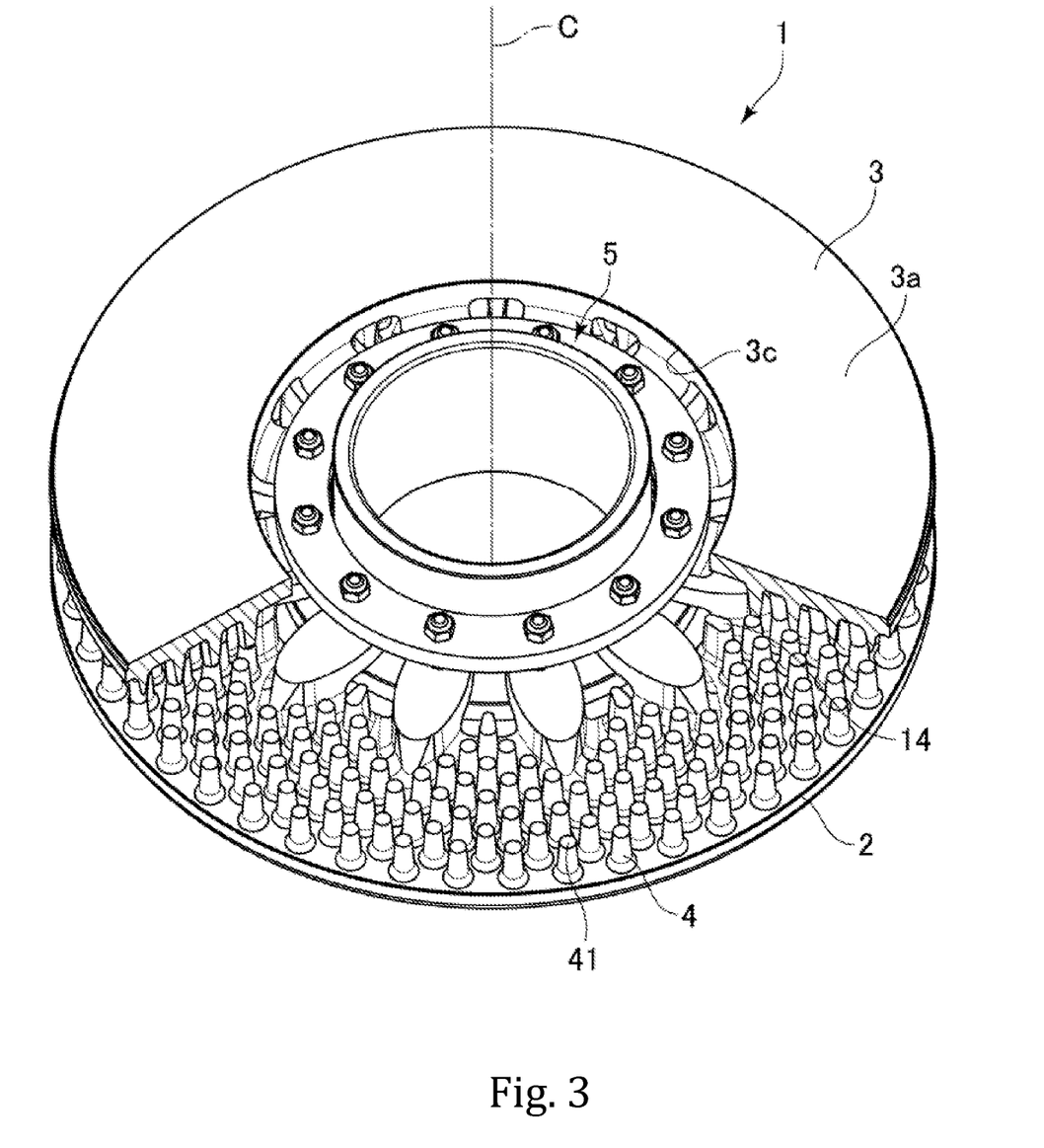
FIG. 3 is a schematic perspective view of the brake disc a part of which is removed to expose a portion therein.
Figure 4:
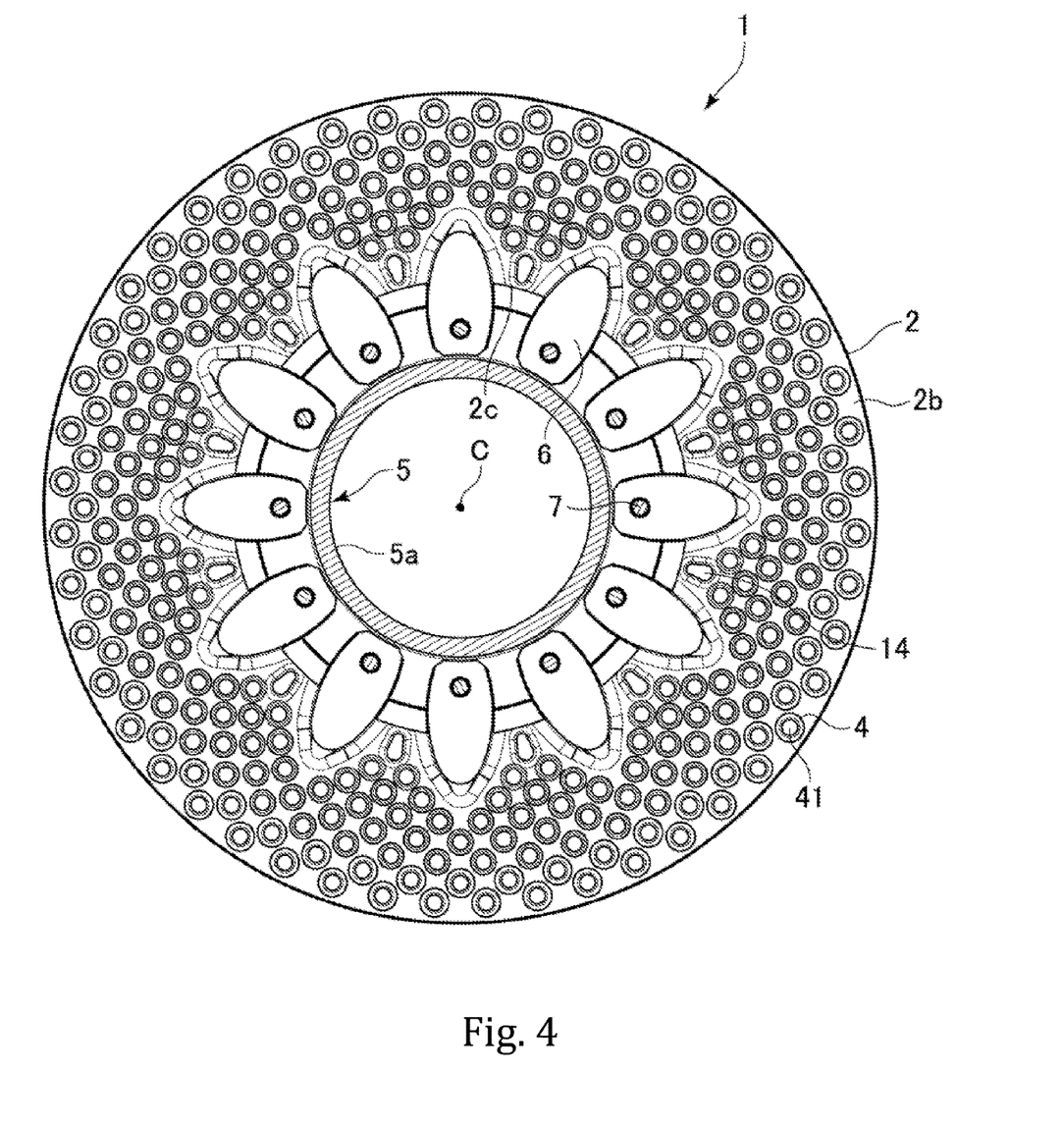
FIG. 4 is a schematic cross-sectional view of the brake disc along the line X-X of FIG. 5.
Figure 5:
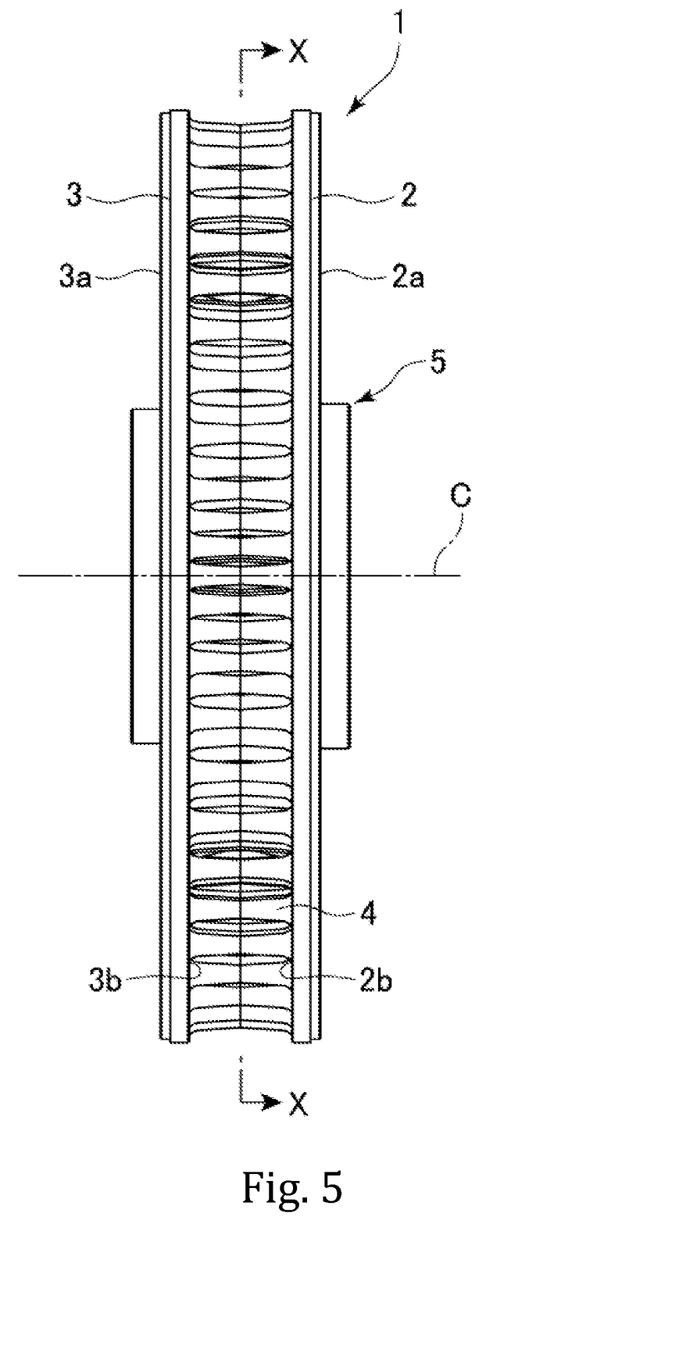
FIG. 5 is a side view of the brake disc in FIG. 1.
Figure 6:
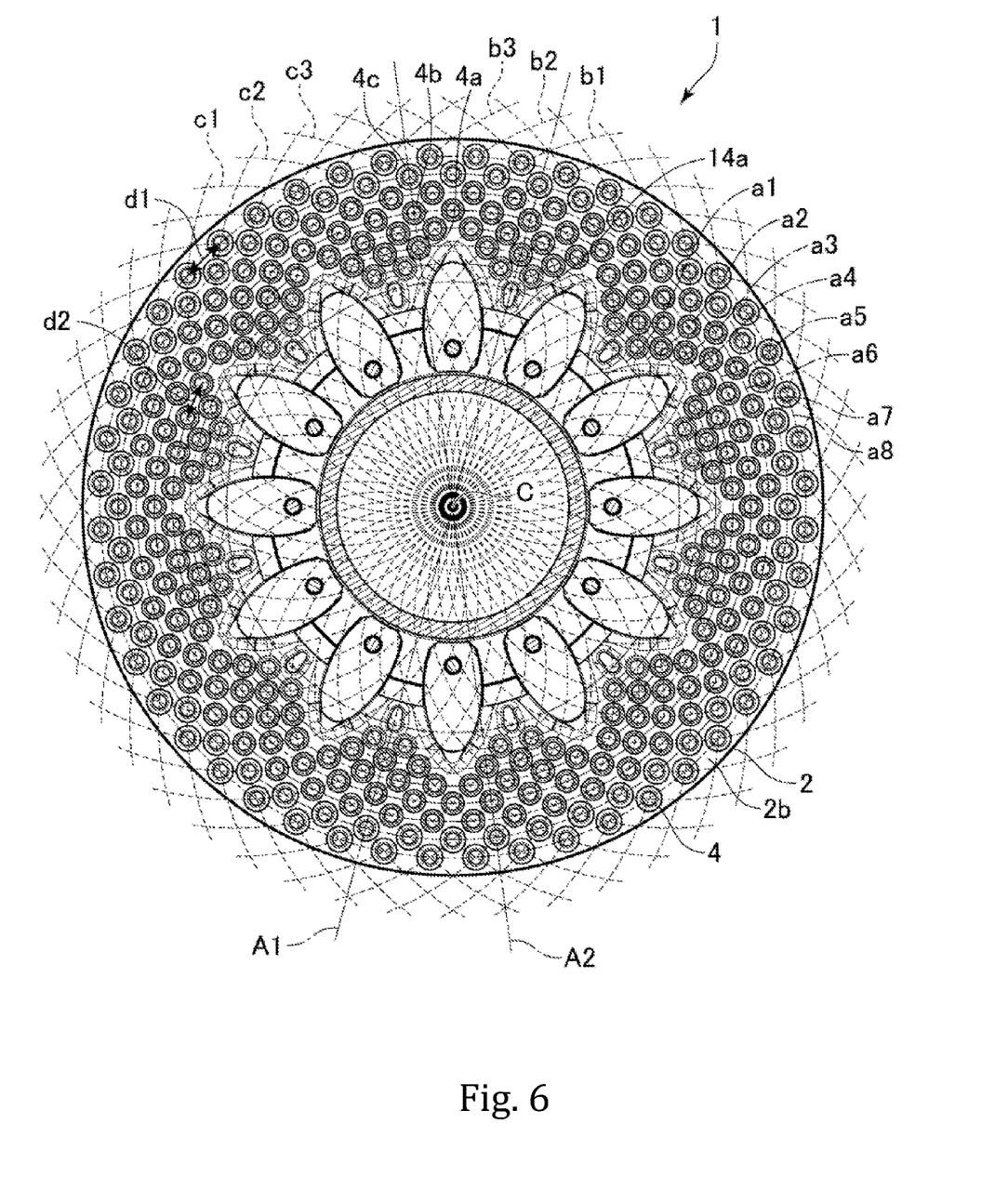
FIG. 6 is a schematic cross-sectional view corresponding to FIG. 5 for explaining an arrangement of pins.

Next, with reference to FIG. 6, the arrangement of the pins 4 as viewed from the axial direction along the central axis C will be described. In FIG. 6, three types of virtual lines are drawn. The pins 4 are arranged at intersections of these three types of virtual lines. The three types of virtual lines will be described in more detail below. Eight circular virtual lines a1 to a8 concentric with the center C of the first disc 2 are drawn. These circular virtual lines may also be referred to as virtual circles. Each of the virtual circles a1 to a8 may be arranged at equal intervals in the radial direction. FIG. 6 shows a first virtual spiral pattern that has a spiral shape passing through the center C of the first disc 2 and curved rightward when viewed from the axial direction along the central axis C, and a second virtual spiral pattern that has a spiral shape passing through the center C of the first disc 2 and curved leftward when viewed from the axial direction along the central axis C are both drawn by broken lines. The first virtual spiral pattern and the second virtual spiral pattern both have a spiral shape in which the distance from the center C of the first disc 2 increases as it turns. In FIG. 6, 48 first spiral patterns and 48 second virtual spiral patterns are drawn. In FIG. 6, for convenience of illustration, the reference numbers are given to only three first virtual spiral patterns b1 to b3 among the 48 first virtual spiral patterns, and the reference numbers are given to only three second virtual spiral patterns c1 to c3 among the 48 second virtual spiral patterns.

Each of the plurality of pins 4 extends in the direction along the central axis C as described above. Each of the pins 4 has one end connected to the first disc 2 and the other end connected to the second disc 3. Alternatively one end of the pins 4 may be connected to the first disc 2 and the other end may not be connected to the second disc 3. In this case, the other end of the pins 4 are separated from the inner surface 3b of the second disc 3 by a predetermined distance in the direction along the central axis C. When the pins 4 are not connected to the second disc 3, the first disc 2 and the second disc 3 are connected by connection pins (not shown). Positions at which one end of the plurality of pins 4 are connected to the first disc are intersections of the three types of virtual lines, which are the virtual circles a1 to a8, the right curved first virtual spiral patterns, and the left curved second virtual patterns. In other words, each of the plurality of pins 4 has its one end connected to the first disc 2 at the intersection of the three types of virtual lines, which are the virtual circles a1 to a8, the right curved first virtual spiral patterns, and the left curved second virtual patterns.

The arrangement of the plurality of pins 4 will be further described by taking pins 4a, 4b, and 4c as examples. As shown in FIG. 6, the pin 4a is disposed at an intersection of three virtual lines, which are the virtual circle a3, the first virtual spiral pattern b1, and the second virtual spiral pattern c1 in plan view. The pin 4b is disposed at an intersection of three virtual lines, which are the virtual circle a5, the first virtual spiral pattern b2, and the second virtual spiral pattern c2 in plan view. The pin 4c is disposed at an intersection of three virtual lines, which are the virtual circle a7, the first virtual spiral pattern b2, and the second virtual spiral pattern c2 in plan view. The plurality of pins 4 are provided on the brake disc 1 and not all of them are specifically described here. However, the rest of the plurality of pins 4 other than the pins 4a, 4b, and 4c are also connected to the first disc 2 in the same manner as the pin 4a, the pin 4b and the pin 4c at the intersections of the three types of virtual lines, which are one of the virtual circles a1 to a8, one of the 48 right curved first virtual spiral patterns, and one of the 48 left curved second virtual spiral patterns.

The number of the virtual circles for determining the arrangement of the pins 4 is not limited to eight. The number of the pins 4 increases as the number of the virtual circles increases, and the heat dissipation effect can be enhanced. On the other hand, as the number of the virtual circles increases, the diameter of the first disc 2 increases and the weight thereof increases. In view of the above, the number of the virtual circles for determining the arrangement of the pins 4 is 5 to 20 in one embodiment.

The number of the first virtual spiral patterns and the second spiral patterns is not limited to 48. The number of the pins 4 increases as the number of the first virtual spiral patterns and the second spiral patterns increases, thus the heat dissipation effect can be enhanced. On the other hand, as the number of the first virtual spiral patterns and the second spiral patterns increases, the size of each pin 4 needs to be decreased in diameter, which likely results in insufficient strength. In view of the above, the number of the first virtual spiral patterns and the second spiral patterns for determining the arrangement of the pins 4 is 20 to 100 in one embodiment.

In one embodiment, the first virtual spiral pattern and the second virtual spiral pattern may be curves having the same shape except for the direction of its turn. In this case, according to a polar coordinate expression (r, θ) with the center C as the origin, the first virtual spiral pattern is a curve represented by r=ae^bθ ("a" is a positive real number and "b" is a negative real number) and the second virtual spiral pattern is a curve represented by r=ae^bθ ("a" is a positive real number and "b" is a positive real number). That is, in the polar coordinate expression, only the sign of "b" is different between the first virtual spiral pattern and the second virtual spiral pattern.

In one embodiment, the plurality of intersections of the three types of virtual lines, which are the virtual circles a1 to a8, the right curved first virtual spiral patterns, and the left curved second virtual spiral patterns, (the plurality of pins 4 arranged at the intersections) are symmetrically arranged with respect to an virtual line connecting an arbitrary one of the plurality of intersections and the center C when viewed from the axial direction along the central axis C. For example, in FIG. 6, an virtual straight line A1 connecting the pin 14a (the innermost pin 14a) arranged at the intersection of the three virtual lines and the center C is drawn. As shown in the drawing, the arrangement of the pins 4 is symmetrical with respect to the virtual straight line A1. In addition, a virtual straight line A2 connecting the center C and the pin 4a (the intersection of the three virtual lines, which are the virtual circle a3, the first virtual spiral pattern b1, and the second virtual spiral pattern c1) is drawn in FIG. 6. As shown in the drawing, the arrangement of the pins 4 is also symmetrical with respect to the virtual straight line A2. This symmetry is established with respect to a virtual straight line connecting the center C and any one of the plurality of intersections of the three virtual lines, which are the virtual circles a1 to a8, the right curved first virtual spiral pattern, and left curved second virtual pattern. Such a symmetrical arrangement of the plurality of pins 4 is realized by, for example, configuring the first virtual spiral pattern and the second virtual spiral pattern to be curves having the same shape except for the direction of turn.

In one embodiment, the plurality of pins 4 are equally arranged in the circumferential direction around the center C on each of the virtual circles a1 to a8. For example, on the virtual circle a1, the innermost pins 14 are arranged at equal intervals in the circumferential direction. On the virtual circles a5 to a8, the pins 4 are arranged at equal intervals in the circumferential direction. On the virtual circle a2, two pins 4 are provided between two adjacent support members 6. Since the support members 6 are provided at equal intervals in the circumferential direction, the weight balance in the circumferential direction is maintained also for the pins 4 arranged on the virtual circle a2. On the virtual circle a3, three pins 4 are provided at equal intervals between the two adjacent support members 6. On the virtual circle a4, four pins 4 are provided at equal intervals between the two adjacent support members 6. Since the support members 6 are provided at equal intervals in the circumferential direction as described above, the weight balance in the circumferential direction is maintained also for the pins 4 arranged on the virtual circle a3 and the virtual circle a4. The arrangement of the pins 4 in which the pins 4 are evenly distributed in the circumferential direction can be realized by, for example, setting the first virtual spiral pattern and the second virtual spiral pattern to be curves that has the same shape except for its direction of turn.

In one embodiment, each of the plurality of first spiral patterns and each of the plurality of second spiral patterns is a spiral pattern selected from the group consisting of a logarithmic spiral pattern, a Fibonacci spiral pattern, an Archimedes spiral pattern, a Ferma spiral pattern, an Euler spiral pattern, a hyperbolic spiral pattern, and a lituus spiral pattern. The logarithmic spiral pattern is a curved pattern represented by a logarithmic spiral. The Fibonacci spiral pattern is a curved pattern represented by a Fibonacci spiral. The Archimedean spiral pattern is a curved pattern represented by an Archimedean spiral. The Fermat spiral pattern is a curved pattern represented by a Fermat spiral. The Euler spiral pattern is a curved pattern represented by an Euler spiral. The hyperbolic spiral pattern is a curved pattern represented by a hyperbolic spiral. The lituus pattern is a curved pattern represented by lituus.

In one embodiment, each of the plurality of first spiral patterns and each of the plurality of second spiral patterns is a golden spiral pattern. The golden spiral pattern is a curved pattern represented by a golden spiral. In one embodiment, the "golden spiral" includes a logarithmic spiral whose growth factor is the golden ratio, ϕ. That is, in one embodiment, a golden spiral gets wider (or further from its origin) by a factor of the golden ratio, ϕ for every quarter turn it makes. Also, in mathematics, two quantities are in the golden ratio, ϕ if their ratio is the same as the ratio of their sum to the larger of the two quantities.

In one embodiment, the arrangement of the pins 4 may be determined such that the distance between the two adjacent pins 4 increases as moving radially outward on the first disc 2. More specifically, the arrangement may be determined such that the distance between the pins 4 arranged along any one of the virtual circles a2 to a8 is larger than the distance between the pins 4 arranged along the virtual circle situated on the inner side in the radial direction. For example, a distance d1 between the two adjacent pins 4 arranged in the circumferential direction along the virtual circle a8 situated radially outermost is larger than a distance d2 between the two adjacent pins 4 arranged in the circumferential direction along the virtual circle a4 situated radially inward relative to the virtual circle a8.

In one embodiment, the arrangement of the pins 4 may be determined such that the distance between two adjacent ones of the plurality of pins 4 arranged on the first virtual spiral pattern is increased as it goes away from the center C along the first virtual spiral pattern. Likewise, the arrangement of the pins 4 may be determined such that the distance between two adjacent ones of the plurality of pins 4 arranged on the second virtual spiral pattern is increased as it goes away from the center C along the second virtual spiral pattern.

Figure 7:
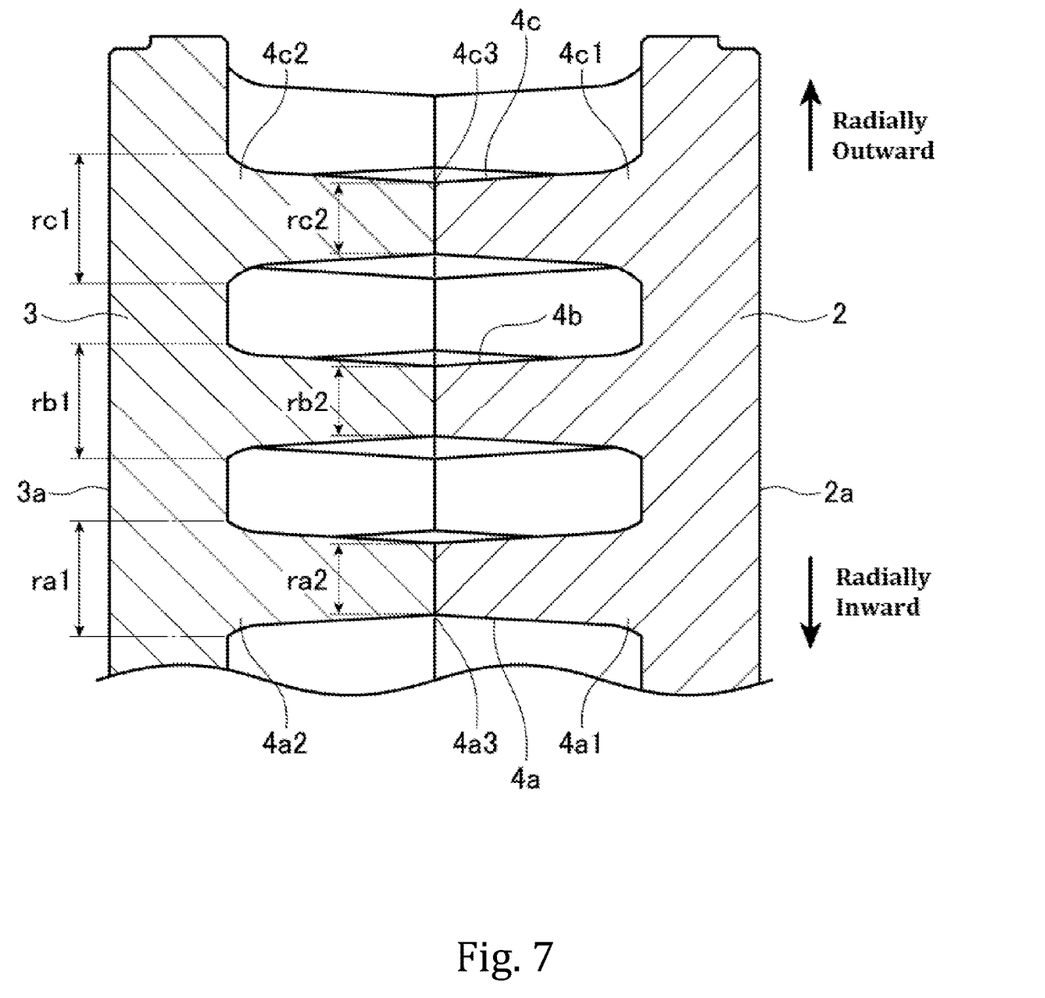
FIG. 7 is a partial cross-sectional view partially showing a cross section of the brake disc in a plane including the central axis C and the virtual line A2 in FIG. 6.

Next, the pins 4 will be further described with reference to FIG. 7. FIG. 7 is a partial cross-sectional view partially showing a cross section of the brake disc in a plane including the central axis C and the virtual line A2 in FIG. 6. FIG. 7 shows a partial cross section of the brake disc 1 including the above-described pin 4*a*, pin 4*b*, and pin 4*c*.

The pin 4*a* includes a first base end portion 4*a*1 connected to the first disc 2, a second base end portion 4*a*2 connected to the second disc 3, and a middle portion 4*a*3 between the first base end portion 4*a*1 and the second base end portion 4*a*2. The middle portion 4*a*3 may be a portion of the pin 4*a* equidistant from the inner surface 2*b* of the first disc 2 and the inner surface 3*b* of the second disc 3 in the direction along the central axis C. In one embodiment, the pin 4*a* may have a cross-sectional dimension ra1 obtained by cutting the first base end portion 4*a*1 or the second base end portion 4*a*2 along a plane orthogonal to the central axis C. The cross-sectional dimension ra1 is larger than a cross-sectional dimension ra2 obtained by cutting the middle portion 4*a*3 along a plane orthogonal to the central axis C and measured in the direction orthogonal to the central axis C. The dimensions ra1 and ra2 refer to the dimensions of the sections in the radial direction of the first disc 2. The second base end portion 4*a*2 may be configured to have the same or similar shape and dimensions as the first base end portion 4*a*1.

The pin 4*b* includes a first base end portion 4*b*1 connected to the first disc 2, a second base end portion 4*b*2 connected to the second disc 3, and a middle portion 4*b*3 between the first base end portion 4*b*1 and the second base end portion 4*b*2. The middle portion 4*b*3 may be a portion of the pin 4*b* equidistant from the inner surface 2*b* of the first disc 2 and the inner surface 3*b* of the second disc 3 in the direction along the central axis C. In one embodiment, the pin 4*b* may have a cross-sectional dimension rb1 obtained by cutting the first base end portion 4*b*1 or the second base end portion 4*b*2 along a plane orthogonal to the central axis C. The cross-sectional dimension rb1 is larger than a cross-sectional dimension rb2 obtained by cutting the middle portion 4*b*3 along a plane orthogonal to the central axis C and measured in the direction orthogonal to the central axis C. The dimensions rb1 and rb2 refer to the dimensions of the sections in the radial direction of the first disc 2. The second base end portion 4*b*2 may be configured to have the same or similar shape and dimensions as the first base end portion 4*b*1.

The pin 4*c* includes a first base end portion 4*c*1 connected to the first disc 2, a second base end portion 4*c*2 connected to the second disc 3, and a middle portion 4*c*3 between the first base end portion 4*c*1 and the second base end portion 4*c*2. The middle portion 4*c*3 may be a portion of the pin 4*c* equidistant from the inner surface 2*b* of the first disc 2 and the inner surface 3*b* of the second disc 3 in the direction along the central axis C. In one embodiment, the pin 4*c* may have a cross-sectional dimension rc1 obtained by cutting the first base end portion 4*c*1 or the second base end portion 4*c*2 along a plane orthogonal to the central axis C. The cross-sectional dimension rc1 is larger than a cross-sectional dimension rc2 obtained by cutting the middle portion 4*c*3 along a plane orthogonal to the central axis C and measured in the direction orthogonal to the central axis C. The dimensions rc1 and rc2 refer to the dimensions of the sections in the radial direction of the first disc 2. The second base end portion 4*c*2 may be configured to have the same or similar shape and dimensions as the first base end portion 4*c*1. Also, the pins 4 other than the pins 4*a*, 4*b*, and 4*c* may each have the first base end portion connected to the first disc 2, the second base end portion connected to the second disc 3, and the middle portion between the first base end portion and the second base end portion. The cross-sectional dimension of each pin 4 obtained by cutting the first base end portion or the second base end portion along a plane orthogonal to the central axis C may be larger than the cross-sectional dimension obtained by cutting the middle portion along a plane orthogonal to the central axis C and measured in the direction orthogonal to the central axis C.

In one embodiment, for two pins 4 having different distances from the center C of the first disc 2, comparing the cross-sectional dimensions obtained by cutting the respective first base ends in a plane orthogonal to the center axis C and measured in a direction orthogonal to the central axis C, the cross-sectional dimension of the pin 4 situated further from the central axis C (that is, the pin situated on the radially outer side) may be larger than the cross-sectional dimension of the pin 4 situated closer to the central axis C (that is, the pin 4 on the radially inner side). In the illustrated embodiment, the pin 4*c* and the pin 4*b* are formed such that the dimension rc1 of the first base end portion 4*c*1 of the pin 4*c* situated on the virtual circle a7 is larger than the dimension rb1 of the first base end portion 4*b*1 of the pin 4*b* situated on the virtual circle a5. As described above, since the pins 4 are disposed at the intersections of the three types of virtual lines, which are the virtual circle a5, the first virtual spiral pattern b2, and the second virtual spiral pattern c2, the distance between two adjacent pins 4 becomes larger as they are situated radially outward. Therefore, the dimension of the first base end portion of one pin 4 (a second pin) among the plurality of pins 4 may be made larger than the dimension of the first base end portion of the pin 4 (a first pin) situated radially inward relative to the first pin. The description of the first base end portion in this paragraph also applies to the second base end portion.

Advantageous effects of the above embodiment will be described below. The brake disc 1 according to the above-described embodiment includes the first disc 2, the second disc 3 spaced apart from the first disc 2 in the axial direction along the center axis C, and the plurality of pins 4 provided between the first disc 2 and the second disc 3. Each of the pins 4 has one end connected to the first disc 2 and the other end connected to the second disc 3. The plurality of pins 4 are connected to the first disc 2 at the intersections of the three types of virtual lines, which are the virtual circles a1 to a8 concentric with the first disc 2, the plurality of first virtual spiral patterns (for example, the first virtual spiral patterns b1 to b3) that pass through the center C of the first disc 2 and are curved rightward when viewed from the axial direction, and the plurality of second virtual spiral patterns (for example, the second virtual spiral patterns c1 to c3) that pass through the center C of the first disc 2 and are curved leftward when viewed from the axial direction. When viewed from the axial direction, the intersections at which these three virtual lines intersect are arranged symmetrically with respect to the virtual line (for example, the virtual line A1 and the virtual line A2) connecting any one of the intersections and the center C of the first disc 2. According to this embodiment, since the surface area of the brake disc 1 can be increased with the plurality of pins 4, a high heat dissipation effect can be obtained. In addition, since each of the plurality of pins is provided along the virtual spiral pattern extending outward from the center C, it is possible to reduce turbulence generated at the time of rotation. Therefore, when the brake disc 1 is used for a brake device of a vehicle, it is possible to reduce running resistance of the vehicle.

In the above embodiment, since the intersections where the three virtual lines intersect are arranged symmetrically with respect to the virtual line connecting one of the intersections and the center C of the first disc 2, it is possible to reduce the occurrence of turbulent flow when the brake disc rotates in either direction. Therefore, the brake disc 1 according to the above embodiment is particularly suitable for a braking device for railway vehicles, in which the axle can rotate at high speed in either direction depending on the traveling direction of the vehicle.

In the above embodiment, a plurality of intersections of the three virtual lines on which the pins 4 are disposed are symmetrically arranged with respect to the virtual line connecting any one of the intersections and the center C of the first disc 2, and therefore the pins 4 can be provided such that the weight is not biased. As a result, in the brake disc 1, an excellent rotational balance is realized.

In the above embodiment, the plurality of pins 4 are evenly arranged in the circumferential direction around the center C of the first disc 2 along each of the imaginary circles a1 to a8. Accordingly, an excellent rotational balance of the brake disc 1 is realized.

In the above embodiment, the pins 4 are arranged such that an interval between two adjacent pins 4 in the circumferential direction around the center C becomes wider as going radially outward. This makes it easier for air current to flow from the outside to the inside of the brake disc 1 and from the inside to the outside of the brake disc 1 when a moving body such as a vehicle equipped with the brake disc 1 travels. In this way, the brake disc 1 can obtain a high heat dissipation effect.

In the above-described embodiment, each pin 4 has the first base end portion (for example, the first base end portion 4a1 of the pin 4a) connected to the first disc 2, the second base end portion (for example, the second base end portion 4a2 of the pin 4a) connected to the second disc 3, and the middle portion (for example, the middle portion 4a3 of the pin 4a) that is situated between the first base end portion and the second base end portion and has a cross section smaller than that of the first base end portion and the second base end portion. Since each pin 4 is connected to the first disc 2 and the second disc 3 by the first base end portion and the second base end portion respectively having a relatively large cross section, it is possible to secure the strength of the connecting portion between the pin 4 and the first and second discs 2, 3. On the other hand, since the middle portion of each pin 4 has a relatively small cross section, it is possible to secure a path of the airflow between the first disc 2 and the second disc 3. As described above, according to the above embodiment, it is possible to ensure the strength of the pin 4 without disturbing the stream of the airflow.

In the above embodiment, taking the pin 4b and the pin 4c that is situated radially outward relative to the pin 4b as an example, the pin 4b and the pin 4c are formed such that the cross-sectional dimension of the first base end portion 4c1 of the pin 4c situated relatively outer side in the radial direction is larger than the cross-sectional dimension of the first base end portion 4b1 of the pin 4b situated relatively inner side in the radial direction. Here, the pin 4b is an example of the first pin and the pin 4c is an example of the second pin. As described above, since the distance between the two adjacent pins 4 increases as it goes outward in the radial direction of the first disc 2, a relatively large stress tends to act on the pins situated relatively outward in the radial direction of the first disc 2 among the plurality of pins 4. However, the cross-sectional dimension of the first base end portion 4c1 of the pins 4c situated relatively outward in the radial direction is made larger than the cross-sectional dimension of the first base end portion 4b1 of the pins 4b, it is possible to secure the sufficient strength against such stress.

In one embodiment, each of the plurality of first spiral patterns and each of the plurality of second spiral patterns is a golden spiral pattern. By forming the first spiral pattern and the second spiral pattern as the golden spiral pattern, it is possible to arrange the pins 4 densely. In one embodiment, the "golden spiral" includes a logarithmic spiral whose growth factor is the golden ratio, $\phi$. That is, in one embodiment, a golden spiral gets wider (or further from its origin) by a factor of the golden ratio, $\phi$ for every quarter turn it makes. Also, in mathematics, two quantities are in the golden ratio, $\phi$ if their ratio is the same as the ratio of their sum to the larger of the two quantities.

The dimensions, materials, and arrangements of the various constituent elements described herein are not limited to those explicitly described in the embodiments, and the various constituent elements can be modified to have any dimensions, materials, and arrangements within the scope of the present invention. Furthermore, constituent elements not explicitly described herein can also be added to the embodiments described, and it is also possible to omit some of the constituent elements described in the embodiments.

What is claimed is:

1. A brake disc comprising:
   a first disc;
   a second disc disposed spaced apart from the first disc in an axial direction; and
   a plurality of pins whose one ends are connected to a side of the first disc facing the second disc,
   the plurality of pins being disposed at intersections between a plurality of virtual circles concentric with the first disc, a plurality of first virtual spiral patterns that pass the center of the first disc and are curved rightward when viewed from the axial direction, and a plurality of second virtual spiral patterns that pass the center of the first disc and are curved leftward when viewed from the axial direction,
   wherein the intersections are arranged symmetrically with respect to an imaginary line connecting any one of the intersections and the center when viewed from the axial direction,
   wherein the plurality of virtual circles include a first virtual circle and a second virtual circle, the second virtual circle with a larger radius than and being concentric to the first virtual circle,
   wherein the plurality of pins are arranged such that a distance between two adjacent pins on the second virtual circle is larger than a distance between two adjacent pins on the first virtual circle, and
   wherein each of the plurality of first spiral patterns and each of the plurality of second spiral patterns is a golden spiral pattern.

2. The brake disc according to claim 1, wherein each of the plurality of pins has a first base end portion connected to the first disc, a second base end portion connected to the second disc, and a middle portion situated between the first base end portion and the second base end portion and having a cross section smaller than a cross section of the first base end portion and the second base end portion.

3. The brake disc according to claim 2, wherein the plurality of pins include a first pin and a second pin that is situated radially outer side relative to the first pin, and
   wherein a cross-sectional dimension of the first base end portion of the second pin is larger than a cross-sectional dimension of the first base end portion of the first pin.

4. The brake disc according to claim 1, wherein
   the plurality of pins are evenly arranged along each of the virtual circles in a circumferential direction around the center of the first disc.

5. The brake disc according to claim 1, wherein five or more virtual circles are provided on the first disc.

6. A brake device comprising the brake disc according to claim 1.

7. The brake disc according to claim 1, wherein the golden spiral pattern is configured to allow the plurality of pins to be arranged more densely between the first disc and the second disc.

8. The brake disc according to claim 1, wherein a configuration in which the plurality of pins are arranged such that the distance between two adjacent pins on the second virtual circle is larger than the distance between two adjacent pins on the first virtual circle facilitates an air current to flow from an outside to an inside of the brake disc and from the inside to the outside of the brake disc when a vehicle equipped with the brake disc travels so as to provide a high heat dissipation in the brake disc.

9. The brake disc according to claim 1, wherein a surface area of the brake disc is configured to increase with the plurality of pins disposed at the intersections between the plurality of virtual circles, the plurality of first virtual spiral patterns, and the plurality of second virtual spiral patterns, and
   wherein an increased surface area of the brake disc is configured to provide a high heat dissipation in the brake disc.

10. The brake disc according to claim 1, wherein the number of the pins in the plurality of pins increases as the number of the virtual circles in the plurality of virtual circles increases, and
    wherein the number of the pins in the plurality of pins increases as the number of the first virtual spiral patterns in the plurality of first virtual spiral patterns increases and the second spiral patterns in the plurality of second virtual spiral patterns increases,
    wherein an increase in the number of pins in the plurality of pins is configured to provide a high heat dissipation in the brake disc.

* * * * *